United States Patent
Murai et al.

(10) Patent No.: US 12,400,342 B2
(45) Date of Patent: Aug. 26, 2025

(54) SURFACE PERFORMANCE EVALUATION DEVICE, SURFACE PERFORMANCE EVALUATION METHOD, AND SURFACE PERFORMANCE EVALUATION PROGRAM

(71) Applicant: TOYOTA JIDOSHA KABUSHIKI KAISHA, Toyota (JP)

(72) Inventors: Yusuke Murai, Susono (JP); Masao Yano, Shizuoka-ken (JP); Tetsuya Shoji, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 358 days.

(21) Appl. No.: 17/968,338

(22) Filed: Oct. 18, 2022

(65) Prior Publication Data

US 2023/0140945 A1    May 11, 2023

(30) Foreign Application Priority Data

Nov. 5, 2021 (JP) ................................. 2021-181371

(51) Int. Cl.
*G06T 7/246* (2017.01)
*G01N 13/00* (2006.01)

(52) U.S. Cl.
CPC ........ *G06T 7/248* (2017.01); *G01N 2013/003* (2013.01); *G06T 2207/10016* (2013.01)

(58) Field of Classification Search
None
See application file for complete search history.

(56) References Cited

U.S. PATENT DOCUMENTS

2020/0103325 A1 *  4/2020  Chu ...................... G01N 13/02

FOREIGN PATENT DOCUMENTS

JP     2006-78477 A     3/2006

OTHER PUBLICATIONS

Techniques for characterising the wetting, coating and spreading of adhesives on surfaces, by Duncan et al., National Physical Laboratory Middlesex, UK (Year: 2005).*
Japanese Industrial Standards Committee, "Testing method of wettability of glass substrate", Jis R 3257, Japanese Standers Association, 1999, pp. 1-11.

* cited by examiner

*Primary Examiner* — Vikkram Bali
(74) *Attorney, Agent, or Firm* — Sughrue Mion, PLLC

(57) ABSTRACT

A surface performance evaluation device including memory and a processor coupled to the memory. The processor being configured to: acquire a captured image, which is a moving image of a test object on which a liquid is dispersed, and which is captured by a camera; quantify, based on the captured image that is acquired by the processor, a degree of diffusion of the liquid that is dispersed on the test object and diffuses; and evaluate a surface performance of the test object based on an index quantified by the processor.

5 Claims, 12 Drawing Sheets

SURFACE PERFORMANCE EVALUATION DEVICE, SURFACE PERFORMANCE EVALUATION METHOD, AND SURFACE PERFORMANCE EVALUATION PROGRAM

CROSS-REFERENCE TO RELATED APPLICATION

This application is based on and claims priority under 35 USC 119 from Japanese Patent Application No. 2021-181371 filed on Nov. 5, 2021, the disclosure of which is incorporated by reference herein.

BACKGROUND

Technical Field

The present disclosure relates to a surface performance evaluation device, a surface performance evaluation method, and a surface performance evaluation program.

Related Art

Non-patent document JIS R 3257:1999 discloses a testing method of wettability of glass substrate. This test evaluates the contact angle of a liquid adhered to a substrate glass by image analysis.

The evaluation method of the Non-patent document JIS R 3257:1999 is not suitable for data-driven material development because evaluation of surface performance, such as wettability, takes time or varies depending on the evaluator. In data-driven material development, it is necessary to acquire quantitative values of surface performance quickly and independent of the evaluator.

SUMMARY

The present disclosure provides a surface performance evaluation device capable of evaluating surface performance independent of an evaluator by quantifying a degree of diffusion of a liquid diffused from a test object that is exposed to the liquid.

A surface performance evaluation device according to a first aspect of the present disclosure includes: an acquisition section configured to acquire a captured image, which is a moving image of a test object on which a liquid is dispersed, and which is captured by an image capture section; a quantification section configured to quantify, based on the captured image that is acquired by the acquisition section, a degree of diffusion of the liquid that is dispersed on the test object and diffuses; and an evaluation section configured to evaluate a surface performance of the test object based on an index quantified by the quantification section.

In the surface performance evaluation device according to the first aspect of the present disclosure, when the acquisition section acquires, as a captured image, a moving image of a test object on which a liquid is dispersed, the quantification section quantifies the degree of diffusion of the liquid based on the captured image, and the evaluation section evaluates the surface performance of the test object based on the index quantified by the quantification section. According to the surface performance evaluation device, surface performance can be evaluated independent of an evaluator by quantifying the degree of diffusion of a liquid diffused from a test object that is exposed to the liquid.

A surface performance evaluation device according to a second aspect of the present disclosure is the surface performance evaluation device according to the first aspect of the present disclosure, wherein: the quantification section is configured to calculate the index based on a frequency distribution for each direction in which the liquid diffuses in a predetermined period of time; and the evaluation section is configured to evaluate the surface performance based on whether or not the index exceeds a threshold value.

In the surface performance evaluation device according to the second aspect of the present disclosure, the evaluation section evaluates the surface performance based on whether or not the index calculated by quantification by the quantification section exceeds a threshold value. The index in the surface performance evaluation device is calculated based on the frequency distribution for each direction in which the liquid diffuses in a predetermined period of time. Namely, according to the surface performance evaluation device, surface performance during a continuous period can be evaluated by quantification based on the frequency distribution in a predetermined period of time.

A surface performance evaluation device according to a third aspect of the present disclosure is the surface performance evaluation device according to the second aspect of the present disclosure, wherein the captured image is captured from a position directly horizontal to the test object.

In the surface performance evaluation device according to the third aspect of the present disclosure, the diffusion direction of the liquid on the test object and the movement direction of the liquid on the captured image can be aligned by capturing an image of the test object from a position directly horizontal to the test object. As a result, according to the surface performance evaluation device, in a case of illustrating the diffusion state of the liquid in a radar chart, the appearance of the radar chart and the captured image can be correlated.

A surface performance evaluation method according to a fourth aspect of the present disclosure includes a computer executing processing, the processing including: acquiring a captured image, which is a moving image of a test object on which a liquid is dispersed, and which is captured by an image capture section; quantifying, based on the captured image that is acquired, a degree of diffusion of the liquid that is dispersed on the test object and diffuses; and evaluating a surface performance of the test object based on a quantified index.

In the surface performance evaluation method according to the fourth aspect of the present disclosure, when a computer acquires, as a captured image, a moving image of a test object on which a liquid is dispersed, the degree of diffusion of the liquid is quantified based on the captured image, and the surface performance of the test object is evaluated based on the quantified index. According to the surface performance evaluation method, surface performance can be evaluated independent of an evaluator by quantifying the degree of diffusion of a liquid diffused from a test object that is exposed to the liquid.

A surface performance evaluation program according to a fifth aspect of the present disclosure is executable by a computer to perform processing, the processing including: acquiring a captured image, which is a moving image of a test object on which a liquid is dispersed, and which is captured by an image capture section; quantifying, based on the captured image that is acquired, a degree of diffusion of the liquid that is dispersed on the test object and diffuses; and evaluating a surface performance of the test object based on a quantified index.

The surface performance evaluation program according to the fifth aspect of the present disclosure causes a computer to execute the following processing. When a computer acquires, as a captured image, a moving image of a test object on which a liquid is dispersed, the degree of diffusion of the liquid is quantified based on the captured image, and the surface performance of the test object is evaluated based on the quantified index. According to the surface performance evaluation program, surface performance can be evaluated independent of an evaluator by quantifying the degree of diffusion of a liquid diffused from a test object that is exposed to the liquid.

According to the present disclosure, surface performance can be evaluated independent of an evaluator by quantifying the degree of diffusion of a liquid diffused from a test object that is exposed to the liquid.

BRIEF DESCRIPTION OF THE DRAWINGS

Exemplary embodiments of the present disclosure will be described in detail based on the following figures, wherein.

DETAILED DESCRIPTION

First Exemplary Embodiment (Configuration)

Figure 1:
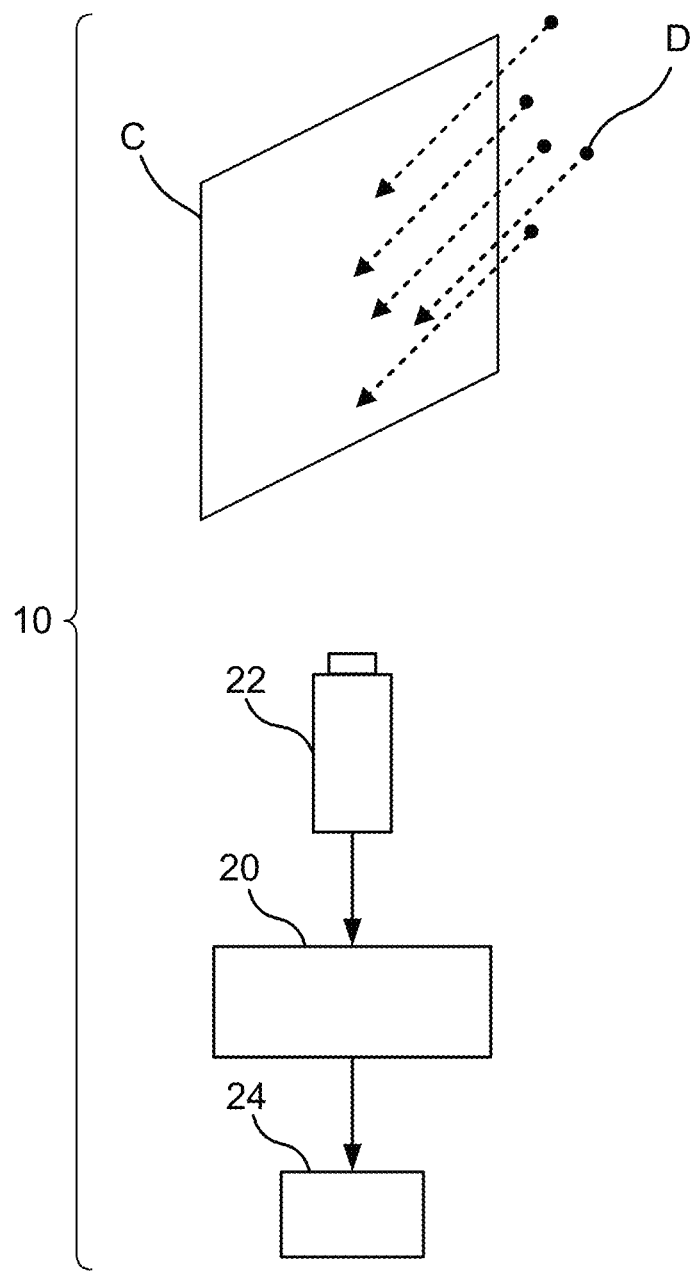
FIG. 1 is a diagram illustrating a schematic configuration of an evaluation system according to a first exemplary embodiment.

FIG. 1 illustrates an evaluation system 10 of a first exemplary embodiment. The evaluation system 10 of the present exemplary embodiment is a device that evaluates the surface performance of a wall surface C in a case in which an oil droplet D, which is a liquid, is dispersed on the wall surface C, which is a test object. The surface performance evaluated in the present exemplary embodiment is the adsorption properties of the wall surface C with respect to the oil droplet D. These adsorption properties are performance that comprehensively incorporate lipophilicity, oil repellency, oil-proof property, hydrophilicity, surface performance, waterproof property, and the like.

As illustrated in FIG. 1, the evaluation system 10 of the present exemplary embodiment includes a processing device 20 serving as a surface performance evaluation device, a camera 22 serving as an image capture section, and a monitor 24 serving as a display section. The camera 22 is fixed in an arrangement that enables the wall surface C to be imaged.

Figure 2:
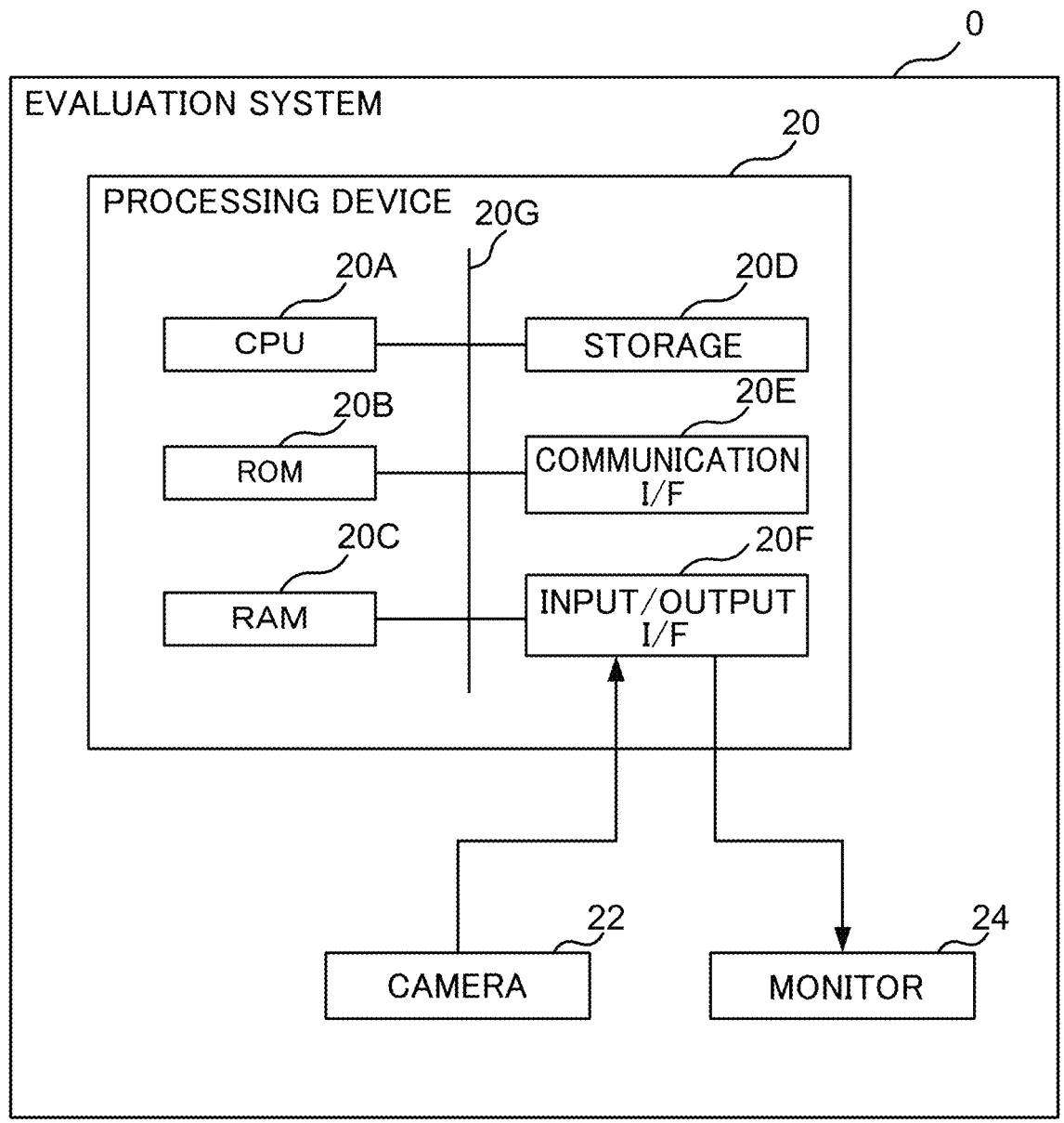
FIG. 2 is a block diagram illustrating a hardware configuration of an evaluation system of the first exemplary embodiment.

As illustrated in FIG. 2, the processing device 20 includes a central processing unit (CPU) 20A, read only memory (ROM) 20B, random access memory (RAM) 20C, storage 20D, a communication interface (I/F) 20E, and an input/output I/F 20F. The CPU 20A, the ROM 20B, the RAM 20C, the storage 20D, the communication I/F 20E, and the input/output I/F 20F are communicably connected to each other via a bus 20G.

The CPU 20A is a central processing unit that executes various programs and controls various components. Namely, the CPU 20A reads a program from the ROM 20B or the storage 20D, and executes the program using the RAM 20C as a workspace.

Figure 3:
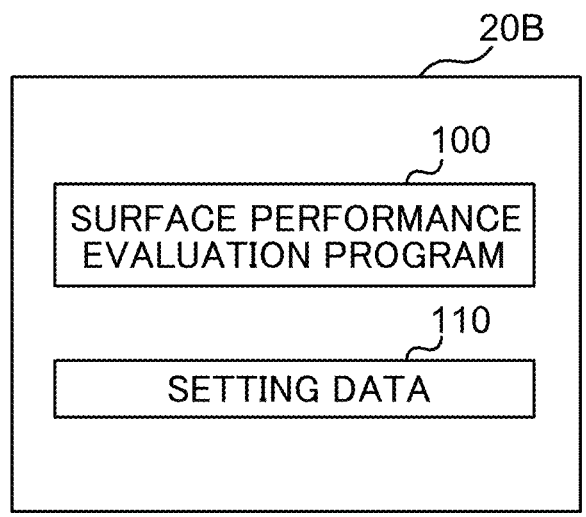
FIG. 3 is a block diagram illustrating a configuration of ROM of the first exemplary embodiment.

The ROM 20B stores various programs and various data. As illustrated in FIG. 3, the ROM 20B of the present exemplary embodiment stores a surface performance evaluation program 100 and setting data 110. The surface performance evaluation program 100 is a program that executes analysis processing which is described later. The setting data 110 is data that defines values such as the number of frames, which becomes an integration period, and threshold values in the analysis processing. Note that the surface performance evaluation program 100 and the setting data 110 may be stored in the storage 20D.

As illustrated in FIG. 2, the RAM 20C serves as a workspace to temporarily store programs and data.

Figure 4:
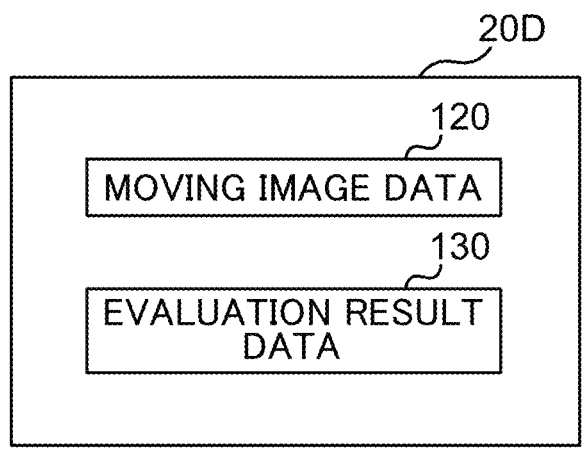
FIG. 4 is a block diagram illustrating a configuration of storage of the first exemplary embodiment.

The storage 20D is configured by a hard disk drive (HDD) or a solid state drive (SSD), and stores various programs and various data. As illustrated in FIG. 4, the storage 20D of the present exemplary embodiment stores moving image data 120 and evaluation result data 130. The moving image data 120 stores image data of a moving image, which is a captured image M captured by the camera 22. The evaluation result data 130 stores data relating to evaluation results of surface performance of the wall surface C. Note that the moving image data 120 and the evaluation result data 130 may be stored in the ROM 20B.

As illustrated in FIG. 2, the communication I/F 20E is an interface for connecting to external devices.

The input/output I/F 20F is an interface for communicating with the camera 22 and the monitor 24. Note that the camera 22 and the monitor 24 may be directly connected to the bus 20G.

Figure 5:
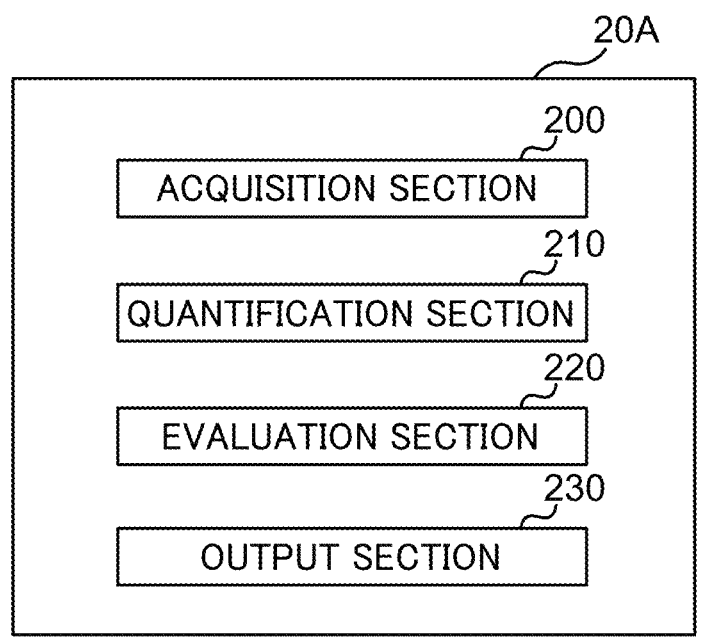
FIG. 5 is a block diagram illustrating a functional configuration of a CPU of the first exemplary embodiment.

As illustrated in FIG. 5, in the processing device 20 of the present exemplary embodiment, the CPU 20A functions as an acquisition section 200, a quantification section 210, an evaluation section 220, and an output section 230 by executing the surface performance evaluation program 100.

The acquisition section 200 has a function of acquiring the captured image M captured by the camera 22. More specifically, the acquisition section 200 acquires a moving image, as the captured image M, in which an oil droplet D is dispersed onto the wall surface C, from the camera 22.

The quantification section 210 has a function of quantifying the degree of diffusion of the oil droplet D that is dispersed on the wall surface C and diffuses. The quantification section 210 vectorizes the diffused oil droplet D in the captured image M, and based on this vectorized information, obtains a histogram that is a frequency distribution for each direction in which the oil droplet D diffuses during predetermined frames. The quantification section 210 then generates a radar chart from the histogram, and calculates a vertical/horizontal component ratio of the wall surface C, as an evaluation index, from the information in the radar chart. Note that the vertical/horizontal component ratio is a ratio of the frequency of a portion (i.e., a vertical component) of the oil droplet D on the wall surface C which has moved in a direction away from or in a direction approaching the wall surface C, with respect to the frequency of a portion (i.e., a horizontal component) of the oil droplet D on the wall surface C which has moved along the wall surface C.

The evaluation section 220 has a function of evaluating the surface performance of the wall surface C based on the evaluation index that is quantified by the quantification section 210. The evaluation section 220 determines that the adsorption properties are "low adsorption properties" in a case in which the evaluation index exceeds a threshold value, and determines that the adsorption properties are "high adsorption properties" in a case in which the evaluation index is equal to or less than the threshold value.

The output section 230 has a function of outputting, to the monitor 24, the captured image M of the oil droplet D that has been vectorized by the quantification section 210.

(Flow of Control)

Figure 6:
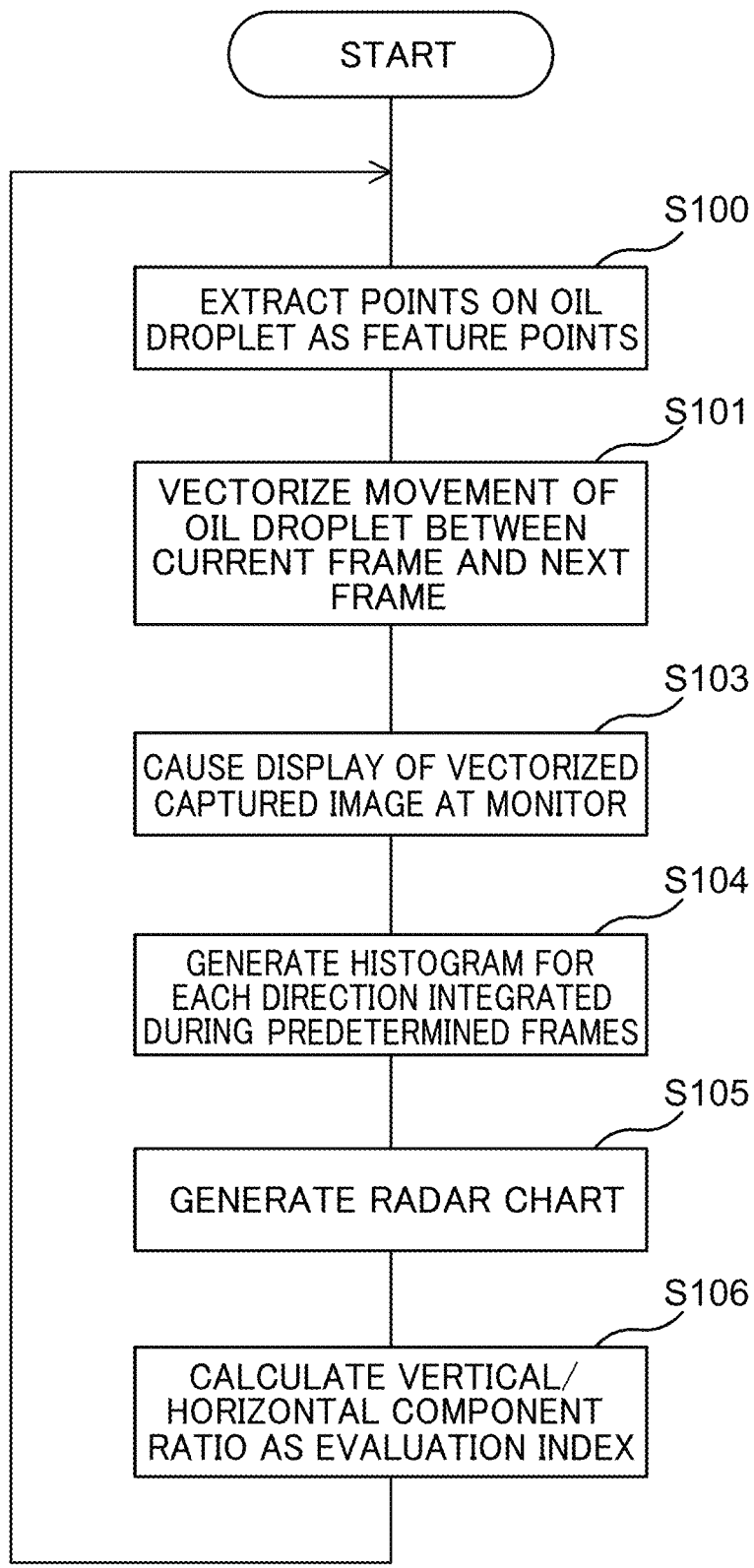
FIG. 6 is a flowchart illustrating a flow of quantification processing of the first exemplary embodiment.
Figure 10:
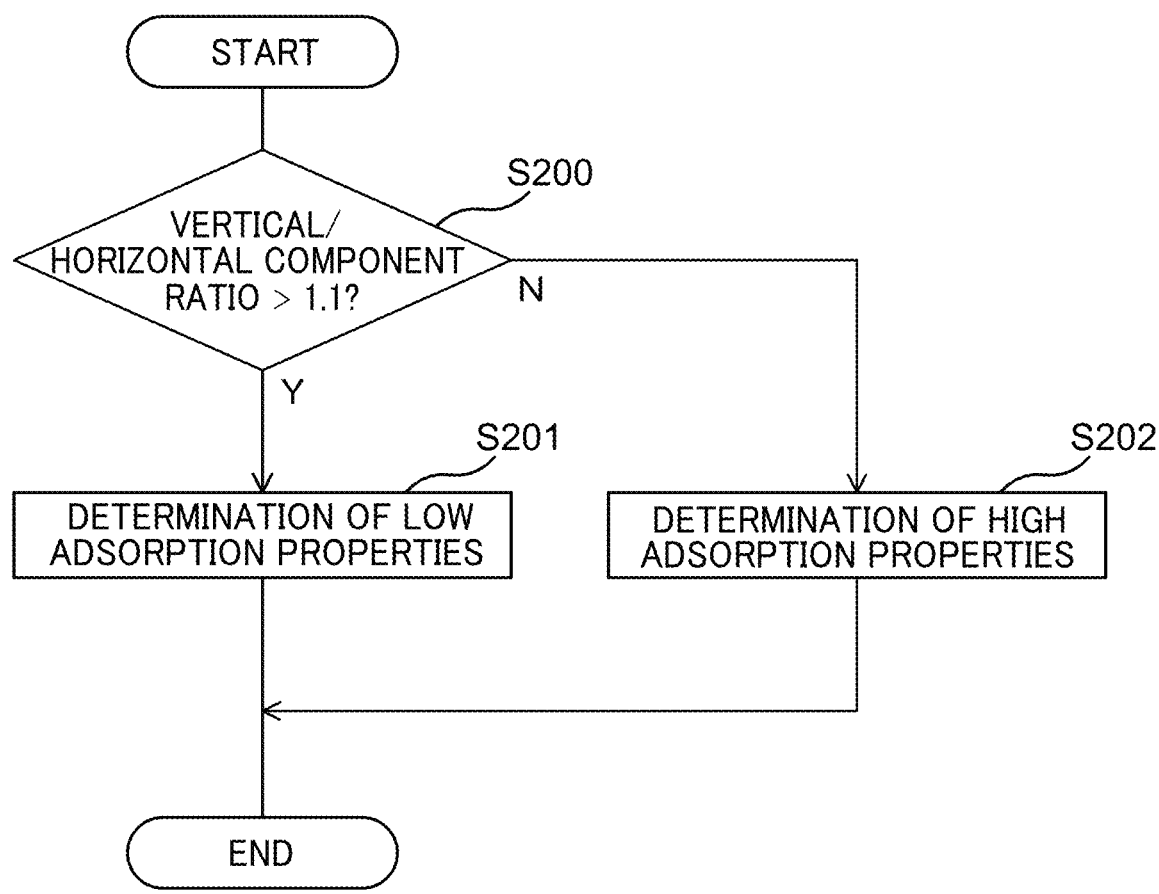
FIG. 10 is a flowchart illustrating a flow of evaluation processing according to the first exemplary embodiment.

Explanation follows regarding a flow of analysis processing executed by the processing device 20 of the present exemplary embodiment, with reference to the flowcharts of FIG. 6 and FIG. 10. Processing performed by the processing device 20 is implemented by the CPU 20A functioning as the acquisition section 200, the quantification section 210, the evaluation section 220, and the output section 230 described above. The analysis processing includes acquisition processing, quantification processing, and evaluation processing.

When the analysis processing is started in the processing device 20, the CPU 20A executes the acquisition processing, and starts acquisition of the captured image M obtained by capturing the wall surface C from the camera 22. The captured image M is a moving image in which the oil droplet D that is dispersed on the wall surface C diffuses on the wall surface C.

Figure 7:
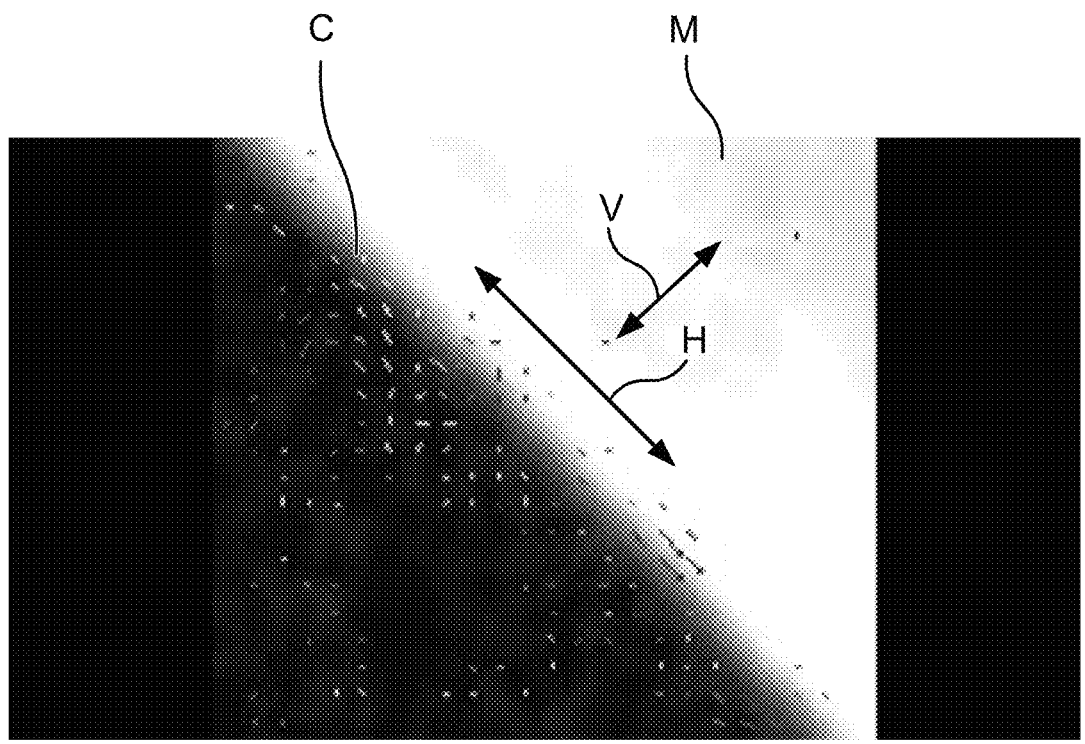
FIG. 7 is an example of a captured image of a test object in the first exemplary embodiment.

Note that during the analysis processing in the present exemplary embodiment, the wall surface C is disposed at an inclination of 45 degrees with respect to a floor surface, and the camera 22 captures images from a position directly horizontal to the wall surface C. Further, the oil droplet D is dispersed in a direction perpendicular to the wall surface C. Namely, as illustrated in FIG. 7, in the captured image M, the wall surface C is disposed along the horizontal direction H from the upper left to the lower right, and the oil droplet D is dispersed on the wall surface C from the upper right along the vertical direction V.

The CPU 20A then executes the quantification processing and the evaluation processing together with the acquisition processing. In the quantification processing, based on the captured image M obtained by capturing the oil droplet D that has collided against the wall surface C, the CPU 20A quantifies the movement frequency of the vertical component (a direction including the vertical direction V) of the oil droplet D with respect to the movement frequency of the horizontal component (horizontal direction H) of the oil droplet D as a vertical/horizontal component ratio. Moreover, in the evaluation processing, the adsorption properties are evaluated based on the vertical/horizontal component ratio.

First, explanation follows regarding the quantification processing illustrated in FIG. 6.

At step S100 in FIG. 6, the CPU 20A extracts points on the oil droplet D from the first frame of the acquired captured image M as feature points.

At step S101, the CPU 20A vectorizes the movement of the oil droplet D between the current frame and the next frame of the captured image M. The CPU 20A thereby extracts the movement direction and the movement distance of each feature point in the oil droplet D.

Figure 8A:
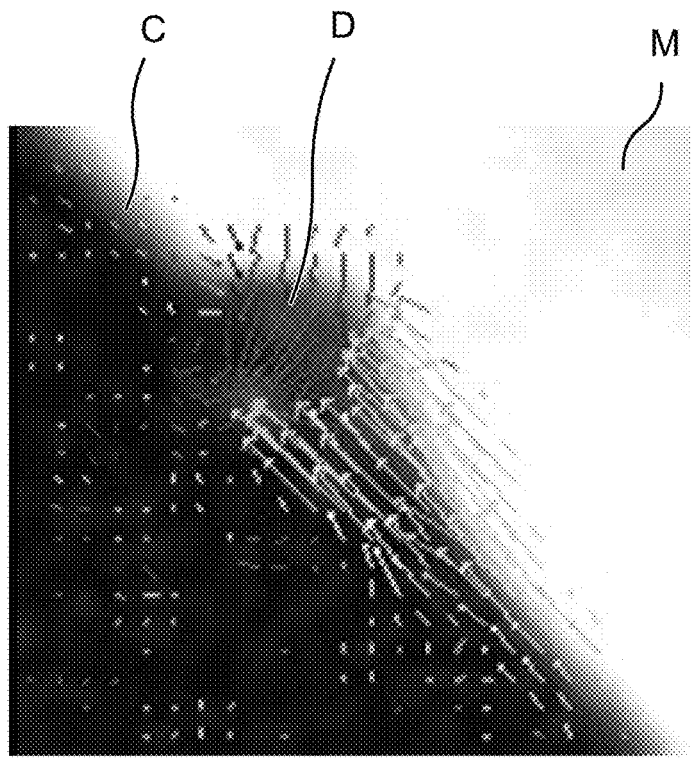
FIG. 8A is a captured image subjected to color tone conversion in the first exemplary embodiment, and is an example of a case in which adsorption properties are highly evaluated.
Figure 8B:
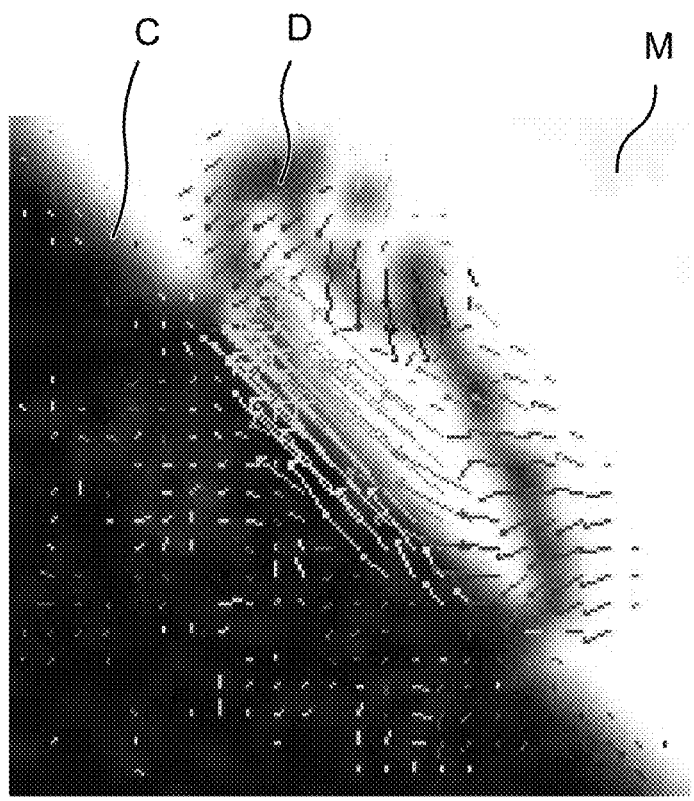
FIG. 8B is a captured image subjected to color tone conversion in the first exemplary embodiment, and is an example of a case in which adsorption properties are lowly evaluated.

At step S103, the CPU 20A causes display of the vectorized captured image M at the monitor 24. FIG. 8A and FIG. 8B are examples in which a state in which the oil droplet D that has collided with the wall surface C moves in the captured image M, illustrated in FIG. 7, is vectorized. Arrows on the captured image M in FIG. 8A and FIG. 8B indicate vectors of respective feature points.

Note that the CPU 20A may convert the color tone of the vectors obtained at step S101, and at step S103, may indicate the movement direction and the movement distance of each feature point of the oil droplet D with respect to the captured image M by hue and brightness. In this case, the CPU 20A converts the vectors of the respective feature points of the oil droplet D into a hue and a brightness in HSV format. Namely, the direction in which the oil droplet D moves is replaced by a hue represented by a range of from 0 to 360 degrees, and the distance traveled by the oil droplet D is replaced by a brightness represented by a range of from 0 to 100%.

At step S104, the CPU 20A generates a histogram for each direction in a case in which the movement of the feature points of the vectorized oil droplet D has been integrated during predetermined frames.

Figure 9A:
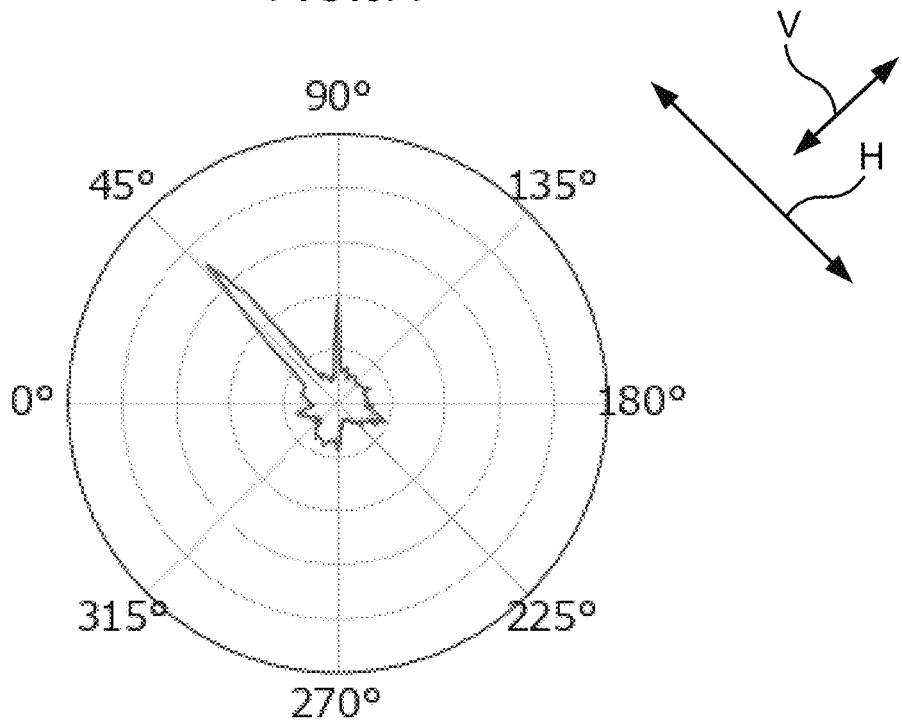
FIG. 9A is a radar chart illustrating the degree of diffusion of an oil droplet in the first exemplary embodiment, and is an example of a case in which adsorption properties are highly evaluated.
Figure 9B:
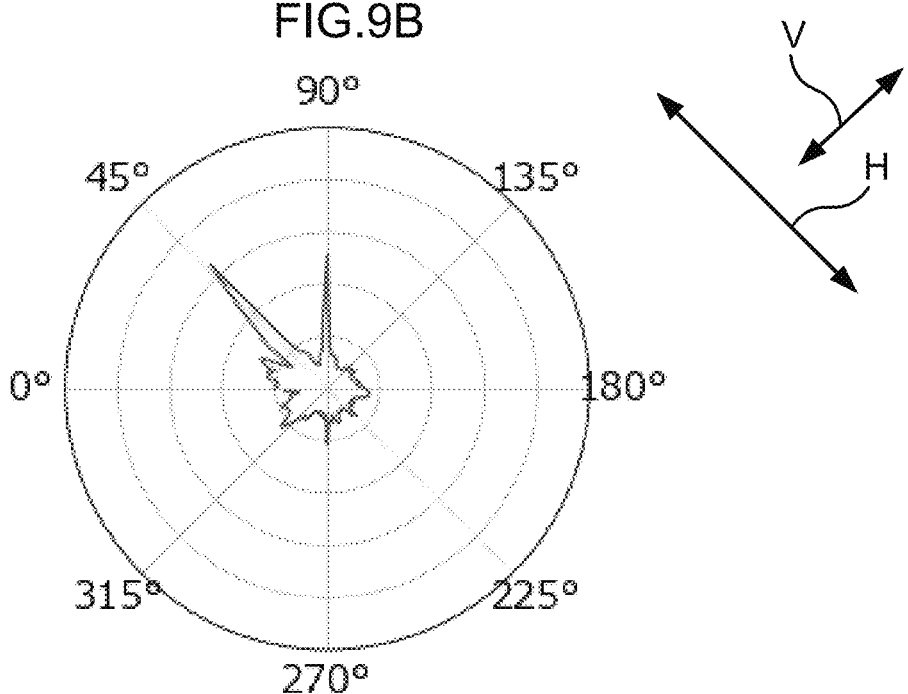
FIG. 9B is a radar chart illustrating the degree of diffusion of an oil droplet in the first exemplary embodiment, and is an example of a case in which adsorption properties are lowly evaluated.

At step S105, the CPU 20A generates a radar chart based on the histogram. As a result, the radar charts as illustrated in FIG. 9A and FIG. 9B are generated. In each of the drawings, a direction of from 45 degrees to 225 degrees corresponds to the horizontal direction H on the wall surface C, and a direction of from 135 degrees to 315 degrees corresponds to the vertical direction V with respect to the wall surface C.

At step S106, the CPU 20A calculates a vertical/horizontal component ratio as an evaluation index. Then, the processing returns to step S100.

As described above, during execution of the analysis processing, the CPU 20A repeats the quantification processing of step S100 to step S106.

Next, explanation follows regarding the evaluation processing illustrated in FIG. 10.

At step S200 in FIG. 10, the CPU 20A determines whether or not the vertical/horizontal component ratio serving as the evaluation index exceeds 1.1. In a case in which the CPU 20A determines that the vertical/horizontal component ratio exceeds 1.1 (in a case of Y at step S200), the processing proceeds to step S201. On the other hand, in a case in which the CPU 20A determines that the vertical/horizontal component ratio does not exceed 1.1, namely, that the vertical/horizontal component ratio is 1.1 or less (in a case of N at step S200), the processing proceeds to step S202.

At step S201, the CPU 20A determines the surface performance as "low adsorption properties", and stores the determination result in the evaluation result data 130. The evaluation processing then ends.

At step S202, the CPU 20A determines the surface performance as "high adsorption properties", and stores the determination result in the evaluation result data 130. The evaluation processing then ends.

Summary of Exemplary Embodiment

In the processing device 20 of the present exemplary embodiment, when the acquisition section 200 acquires, as the captured image M, a moving image in which the oil droplet D is dispersed on the wall surface C, the quantification section 210 quantifies the degree of diffusion of the oil droplet D based on the captured image M, and the evaluation section 220 evaluates the adsorption properties of the test object based on the quantified index. More specifically, when the oil droplet D dispersed on the wall surface C diffuses on the wall surface C, based on the captured image M of the wall surface C captured by the camera 22, the quantification section 210 vectorizes the movement of the oil droplet D in the captured image M, and generates a histogram for each direction between the captured frames. Moreover, the quantification section 210 generates a radar chart based on the histogram, and calculates the vertical/horizontal component ratio of the radar chart as an evaluation index. The evaluation section 220 then determines whether or not the adsorption properties are favorable, based on whether or not the vertical/horizontal component ratio exceeds a threshold value of 1.1.

FIG. 9A is an example in which the adsorption properties are determined to be high adsorption properties, the rebound of the oil droplet D from the wall surface C was small, and the vertical/horizontal component ratio was less than 1.1. FIG. 8A is an example in which, in the example of FIG. 9A, one frame in the captured image M serving as the basis for calculation of the vertical/horizontal component ratio is vectorized and displayed at the monitor 24. As illustrated in FIG. 8A, the lower right approximately ⅔ of the oil droplet D is occupied by vectors in the horizontal direction H, and vectors having a component in the vertical direction V are present only in the upper left approximately ⅓ of the oil droplet D. This enables the situation in which the oil droplet D is diffused widely in the horizontal direction H and is easily adsorbed by the wall surface C to be visually observed.

FIG. 9B is an example in which the adsorption properties are determined to be low adsorption properties, the rebound of the oil droplet D from the wall surface C was large, and the vertical/horizontal component ratio exceeded 1.1. FIG. 8B is an example in which, in the example of FIG. 9B, one frame in the captured image M serving as the basis for calculation of the vertical/horizontal component ratio is vectorized and displayed at the monitor 24. As illustrated in FIG. 8B, although vectors in the horizontal direction H are present near the wall surface C, the oil droplet D is occupied by vectors having a component in the vertical direction V at a position away from the wall surface C. This enables the situation in which the oil droplet D is not diffused in the horizontal direction H and is not adsorbed by the wall surface C to be visually observed.

As described above, according to the processing device 20 of the present exemplary embodiment, the degree of diffusion of the oil droplet D diffused from the wall surface C that is exposed to the oil droplet D is quantified as a vertical/horizontal component ratio, which is the evaluation index, enabling surface performance to be evaluated independent of an evaluator. In particular, since the evaluation index is calculated based on a histogram for each direction in which the oil droplet D diffuses during predetermined frames, according to the present exemplary embodiment, the surface performance of successive periods can be evaluated. Moreover, the movement and state of diffusion of the oil droplet D can be better visually observed by vectorizing the oil droplet D in the captured image M compared to a case in which the movement of the oil droplet D is simply visually observed. In addition, according to the present exemplary embodiment, subtle differences in adsorption properties (more specifically, lipophilicity, oil repellency, oil-proof property, hydrophilicity, surface performance, waterproof property, and the like) of the wall surface C can be evaluated without human evaluation, and therefore, the present exemplary embodiment is suitable for data-driven material development.

Figure 11:
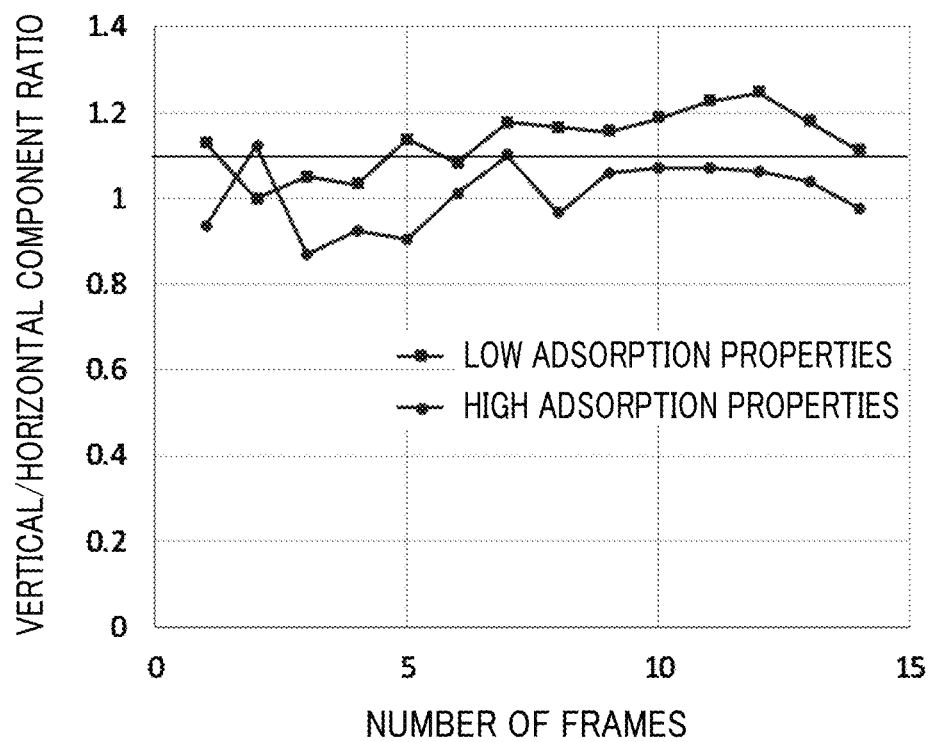
FIG. 11 is a diagram illustrating the relationship between the number of frames and the vertical/horizontal component ratio.

Note that the processing device 20 uses vectors of the oil droplet during predetermined frames as an integration period for creating a histogram and a radar chart. However, there is no limitation thereto, and an arbitrary period of time which is suitable for evaluation can be set as the integration period. For example, as illustrated in FIG. 11, setting an integration period of around 8 to 13 frames from the start of the analysis processing enables the quality of the surface performance to be clearly determined.

In the present exemplary embodiment, whether or not the adsorption properties are favorable as surface performance is determined based on whether or not the vertical/horizontal component ratio exceeds a threshold value of 1.1; however, there is no limitation thereto, and any value may be set according to analysis needs.

Moreover, in the present exemplary embodiment, the vertical/horizontal component ratio of the radar chart is used as the evaluation index; however, there is no limitation thereto, and an area or the like calculated from the radar chart may be used as the evaluation index. In this case, the surface performance can be determined based on whether or not the evaluation index, which is the area, exceeds a predetermined threshold value.

Second Exemplary Embodiment

The second exemplary embodiment differs from the first exemplary embodiment in the configuration of the evaluation system 10. Explanation follows regarding differences from the first exemplary embodiment. Note that the other configurations are the same as those of the first exemplary embodiment, and detailed explanation thereof is omitted.

Figure 12:
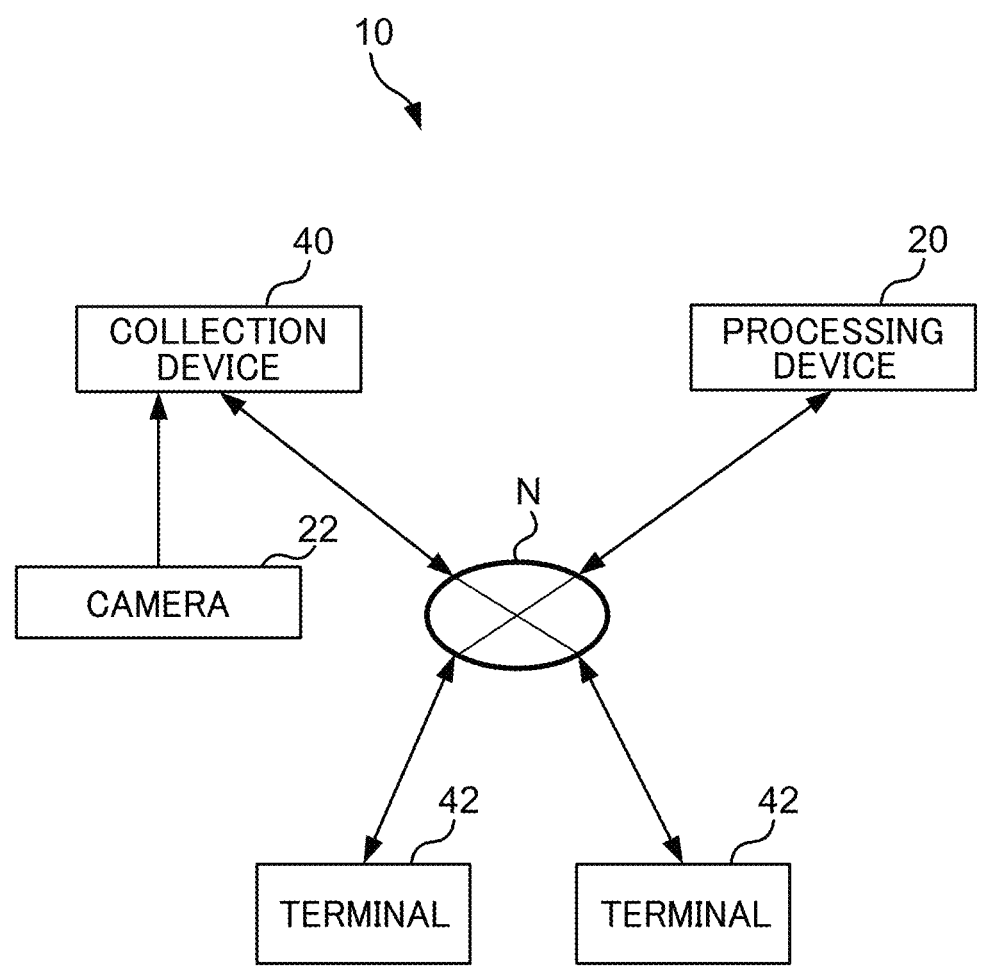
FIG. 12 is a diagram illustrating a schematic configuration of an evaluation system according to a second exemplary embodiment.

As illustrated in FIG. 12, the evaluation system 10 of the present exemplary embodiment includes a processing device 20, a collection device 40, and plural terminals 42. The processing device 20, the collection device 40, and the terminals 42 are connected together through a network N. The processing device 20 of the present exemplary embodiment can be, for example, a cloud server. At least the camera 22 is connected to the collection device 40 of the present exemplary embodiment. The terminals 42 are, for example, personal computers.

In the evaluation system 10 of the present exemplary embodiment, the collection device 40 collects the captured image M of the wall surface C captured by the camera 22 and uploads the captured image M such that the processing device 20 performs evaluation of surface performance. The terminals 42 can display the evaluation results acquired from the processing device 20 and the captured image M of the vectorized oil droplet D. This enables the evaluation work of the wall surface C to be performed at a location away from the test location.

Otherwise, the present exemplary embodiment exhibits operation and effects similar to those of the first exemplary embodiment.

NOTES

Note that in each of the above-described embodiments, any of various types of processors other than CPU may execute the processing that the CPU 20A executes by reading software (programs). Examples of such processors include a Programmable Logic Device (PLD) in which the circuit configuration can be modified post-manufacture, such as a Field-Programmable Gate Array (FPGA), or a specialized electric circuit that is a processor with a specifically-designed circuit configuration for executing specific processing, such as an Application Specific Integrated Circuit (ASIC). Further, each of the above-described processing may be executed by one of these various types of processors, or may be executed by combining two or more of the same type or different types of processors (e.g., plural FPGAs, or a combination of a CPU and an FPGA, or the like). Further, a hardware configuration of the various processors is specifically formed as an electric circuit combining circuit elements such as semiconductor elements.

Moreover, explanation has been given regarding an aspect in which the respective programs are stored (installed) in advance on a non-transitory recording medium that is readable by a computer in each of the above-described exemplary embodiments. For example, the surface performance evaluation program 100 in the processing device 20 is stored in advance in the ROM 20B. However, there is no limitation thereto, and the respective programs may be provided in a format recorded on a non-transitory recording medium such as a compact disc read only memory (CD-ROM), a digital versatile disc read only memory (DVD-ROM), or universal serial bus (USB) memory. Alternatively, the programs may be provided in a format downloadable from an external device over a network.

The flow of processing described in the above exemplary embodiments is also one example, and unnecessary steps may be deleted, new steps may be added, or the processing order may be rearranged within a range not departing from the gist of the present disclosure.

What is claimed is:

1. A surface performance evaluation device comprising memory and a processor coupled to the memory, and the processor being configured to:
    acquire a captured image, which is a moving image of a test object on which a liquid is dispersed, and which is captured by a camera;
    quantify, based on the captured image that is acquired by the processor, a degree of diffusion of the liquid dispersed on the test object as a frequency distribution for each direction in which the liquid diffuses, and further calculate a vertical/horizontal component ratio of the test object according to the frequency distribution; and
    evaluate a surface performance of the test object based the vertical/horizontal component ratio.

2. The surface performance evaluation device according to claim 1, wherein:
    the processor is configured to:
    evaluate the surface performance based on whether or not the vertical/horizontal component ratio exceeds a threshold value.

3. The surface performance evaluation device according to claim 2, wherein the captured image is captured from a position directly horizontal to the test object.

4. A surface performance evaluation method executed by a processor for evaluating a surface performance, the surface performance evaluation method comprising:
    acquiring a captured image, which is a moving image of a test object on which a liquid is dispersed, and which is captured by a camera;
    quantifying, based on the captured image that is acquired, a degree of diffusion of the liquid dispersed on the test object as a frequency distribution for each direction in which the liquid diffuses, and further calculating a vertical/horizontal component ratio of the test object according to the frequency distribution; and
    evaluating a surface performance of the test object based on the vertical/horizontal component ratio.

5. A non-transitory computer-readable recording medium storing a surface performance evaluation program executable by a processor to perform processing, the processing comprising:
    acquiring a captured image, which is a moving image of a test object on which a liquid is dispersed, and which is captured by a camera;
    quantifying, based on the captured image that is acquired, a degree of diffusion of the liquid dispersed on the test object diffuses, and further calculating a vertical/horizontal component ratio of the test object according to the frequency distribution; and
    evaluating a surface performance of the test object based on a the vertical/horizontal component ratio.

* * * * *